(12) United States Patent
Sakai et al.

(10) Patent No.: US 6,787,252 B2
(45) Date of Patent: Sep. 7, 2004

(54) PERPENDICULAR MAGNETIC RECORDING MEDIUM

(75) Inventors: Yasushi Sakai, Nagano (JP); Sadayuki Watanabe, Nagano (JP)

(73) Assignee: Fuji Electric Co., Ltd., Kawasaki (JP)

(*) Notice: Subject to any disclaimer, the term of this patent is extended or adjusted under 35 U.S.C. 154(b) by 0 days.

(21) Appl. No.: 10/227,524

(22) Filed: Aug. 26, 2002

(65) Prior Publication Data

US 2003/0076632 A1 Apr. 24, 2003

(30) Foreign Application Priority Data

Aug. 24, 2001 (JP) ........................................ 2001-255072

(51) Int. Cl.7 .............................. G11B 5/66; G11B 5/70
(52) U.S. Cl. ......................... 428/694 TS; 428/694 TM; 428/900
(58) Field of Search ..................... 428/694 T, 694 TS, 428/694 TP, 900, 694 TM

(56) References Cited

U.S. PATENT DOCUMENTS

| | | | | |
|---|---|---|---|---|
| 5,543,221 A | * | 8/1996 | Kitakami et al. | ............ 428/332 |
| 6,420,058 B1 | * | 7/2002 | Haratani et al. | ......... 428/694 T |
| 6,426,157 B1 | * | 7/2002 | Hokkyo et al. | ...... 428/694 TM |

* cited by examiner

Primary Examiner—Holly Rickman

(57) ABSTRACT

A perpendicular magnetic recording medium without shift or loss of written signals even in a case of a high recording density in a rare earth-transition metal alloy amorphous film, and where productivity is excellent. The perpendicular magnetic recording medium includes a soft magnetic under layer, an intermediate layer, a magnetic recording layer including a rare earth-transition metal alloy amorphous film and at least one of Ti, Zr, Hf, V, Nb, Ta, Cr, Mo, W, B, Al, C and Si or a boride or carbide uniformly dispersed in the rare earth-transition metal alloy amorphous film, a protective layer, a liquid lubricant layer, and a nonmagnetic substrate. The soft magnetic under layer, the intermediate layer, the magnetic recording layer, and the protective layer are built up in a predetermined order on the nonmagnetic substrate.

9 Claims, 2 Drawing Sheets

PERPENDICULAR MAGNETIC RECORDING MEDIUM

CROSS REFERENCE TO RELATED APPLICATIONS

This application claims the benefit of Japanese Application No. 2001-255072 filed Aug. 24, 2001, in the Japanese Patent Office, the disclosure of which is incorporated herein by reference.

BACKGROUND OF THE INVENTION

1. Field of the Invention

The present invention relates to a perpendicular magnetic recording medium that can be installed in various magnetic recording apparatuses.

2. Description of the Related Art

Accompanying increases in capacity of magnetic disk recording apparatuses, there have been heightened demands to increase a recording density of magnetic recording media. A longitudinal magnetic recording method occupies a mainstream among conventional magnetic recording methods, but recently a perpendicular magnetic recording method has started to attract attention as an art to increase the recording density of the magnetic recording media.

Elements of a perpendicular magnetic recording medium include a magnetic recording layer of a hard magnetic material, and an under layer formed from a soft magnetic material that concentrates magnetic flux generated by the magnetic head used in recording into the magnetic recording layer. At present a CoCr type alloy crystalline film is predominantly used as a material for the magnetic recording layer used in the perpendicular magnetic recording medium. With such a film, a maximum value of the coercivity (Hc) is about 4000 Oe at present. Although to further increase the recording density it is necessary to further increase Hc, there are technical difficulties in fulfilling this demand.

On the other hand, a rare earth-transition metal alloy amorphous film that is used as a material for magneto-optical recording has a high perpendicular magnetic anisotropy constant Ku, and hence this film is extremely promising as a material for the magnetic recording layer of the perpendicular magnetic recording medium. However, in magneto-optical recording, a composition close to a compensation point is used, and Hc for such a composition is considerable larger than the Hc required of a material for perpendicular magnetic recording, and hence it is problematic to use the rare earth-transition metal alloy amorphous film as a perpendicular magnetic recording medium.

SUMMARY OF THE INVENTION

Various objects and advantages of the invention will be set forth in part in the description that follows and, in part, will be obvious from the description, or may be learned by practice of the invention.

A Co type alloy crystalline magnetic recording material has a columnar structure in which crystal grains grow in a film thickness direction, which is a main cause of noise originating from a magnetic recording medium during recording and playback. As a recording density is increased in the future, influence of a crystal grain boundary on recorded signals will come to account for a larger and larger proportion.

Attempts are being made to reduce the influence of the crystal grain boundary by, for example, making a size of the crystal grain very small, but if the size of the crystal grain becomes too small, then a thermal stability of the recorded signal deteriorates abruptly, and in some cases a so-called "thermal fluctuation" problem in which a recorded signal vanishes may arise.

On the other hand, in the case that a rare earth-transition metal alloy amorphous film is used, due to being amorphous, the crystal grain boundaries do not exist, and hence the above problem does not arise. However, because the crystal grain boundaries do not exist there is nothing to act as a nucleus to keep a recorded signal in place, and hence there is a problem that the recorded signal may shift or vanish. In particular, the recorded signal may shift or vanish when recording at a high frequency. Hence, the rare earth-transition metal alloy amorphous film cannot be used as is, as a material for perpendicular magnetic recording to increase recording density.

In view of such problems, it is an object of the present invention to provide a perpendicular magnetic recording medium according to which there is no shift or loss of the recorded signals even in the case of high recording density using the rare earth-transition metal alloy amorphous film, and moreover, productivity is excellent.

Regarding an embodiment of the present invention, perpendicular magnetic recording medium, including: a soft magnetic under layer; an intermediate layer; a magnetic recording layer including a rare earth-transition metal alloy amorphous film and at least one of Ti, Zr, Hf, V, Nb, Ta, Cr, Mo, W, B, Al, C and Si uniformly dispersed in the rare earth-transition metal alloy amorphous film; a protective layer; a liquid lubricant layer; and a nonmagnetic substrate, wherein the soft magnetic under layer, the intermediate layer, the magnetic recording layer, and the protective layer are built up in a predetermined order on the nonmagnetic substrate.

Moreover, an embodiment in accordance with the present invention a perpendicular magnetic recording medium, including: a soft magnetic under layer, an intermediate layer, a magnetic recording layer including a rare earth-transition metal alloy amorphous film and at least one boride of Ti, Zr, Hf, V, Nb, Ta, Cr, Mo, W, Al or Si uniformly dispersed in the rare earth-transition metal alloy amorphous film; a protective layer; and a nonmagnetic substrate, wherein the soft magnetic under layer, the intermediate layer, the magnetic recording layer, and the protective layer are built up in a predetermined order on the nonmagnetic substrate.

Moreover, an embodiment in accordance with the present invention provides a perpendicular magnetic recording medium, including: a soft magnetic under layer; an intermediate layer; a magnetic recording layer including a rare earth-transition metal alloy amorphous film and at least one carbide of Ti, Zr, Hf, V, Nb, Ta, Cr, Mo, W, B, Al or Si uniformly dispersed in the rare earth-transition metal alloy amorphous film; a protective layer; a liquid lubricant layer; and a nonmagnetic substrate, wherein the soft magnetic under layer, the intermediate layer, the magnetic recording layer, and the protective layer are built up in a predetermined order on the nonmagnetic substrate.

Moreover, a concentration of the at least one of Ti, Zr, Hf, V, Nb, Ta, Cr, Mo, W, B, Al, C and Si or boride or carbide thereof in the rare earth-transition metal alloy amorphous film is at least 1% but not more than 20%.

Moreover, an underlayer; and a magnetic domain controlling layer, wherein the underlayer and the magnetic domain controlling layer are between the nonmagnetic substrate and the soft magnetic under layer.

As described above, according to an embodiment of the present invention, a perpendicular magnetic recording medium includes a soft magnetic under layer, an intermediate layer, a magnetic recording layer, a protective layer and a liquid lubricant layer built up in a predetermined order on a nonmagnetic substrate, wherein the magnetic recording layer is made of a rare earth-transition metal alloy amorphous film, which includes at least one of Ti, Zr, Hf, V, Nb, Ta, Cr, Mo, W, B, Al, C and Si or a boride or a carbide uniformly dispersed through the rare earth-transition metal alloy amorphous film. As a result, compared to a case where the perpendicular magnetic recording medium is produced without adding element(s) Ti, Zr, Hf, V, Nb, Ta, Cr, Mo, W, B, Al, C and/or Si, extremely good characteristics can be obtained at a high recording density. It is necessary to make a concentration of the element(s) or the boride(s) or the carbide(s) to be between 1% and 20%, and even if a plurality of additives (i.e., the element(s) or the boride(s) or the carbide(s)) are added at the same time, the perpendicular magnetic recording medium exhibiting good characteristics can be produced.

Moreover, by providing one or a plurality of underlayers and an antiferromagnetic layer for magnetic domain control of the soft magnetic under layer between the nonmagnetic substrate and the soft magnetic under layer, spike noise due to a magnetic domain wall formation in the soft magnetic layer can be completely suppressed, which is extremely desirable when making the perpendicular magnetic recording medium fit for practical use.

Furthermore, the method of manufacturing the perpendicular magnetic recording medium of the present invention can be carried out using an existing manufacturing apparatus, and hence this method is suited for mass production of high-capacity magnetic recording media.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantage of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
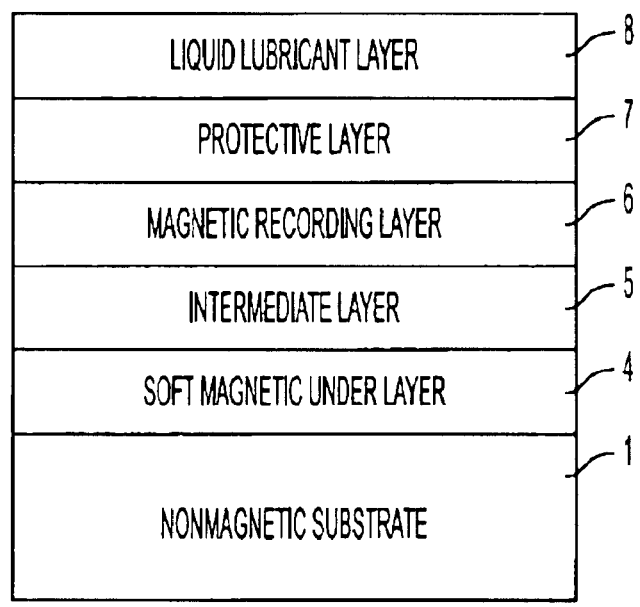
FIG. 1 is a schematic sectional view showing a perpendicular magnetic recording medium in accordance with an embodiment of the present invention.

FIG. 1 is a schematic sectional view showing an embodiment of a perpendicular magnetic recording medium in accordance with an embodiment of the present invention. The perpendicular magnetic recording medium has a structure in which at least a soft magnetic under layer 4, an intermediate layer 5, a magnetic recording layer 6 and a protective layer 7 are formed in a predetermined order on a nonmagnetic substrate 1, and a liquid lubricant layer 8 is formed thereupon.

Figure 2:
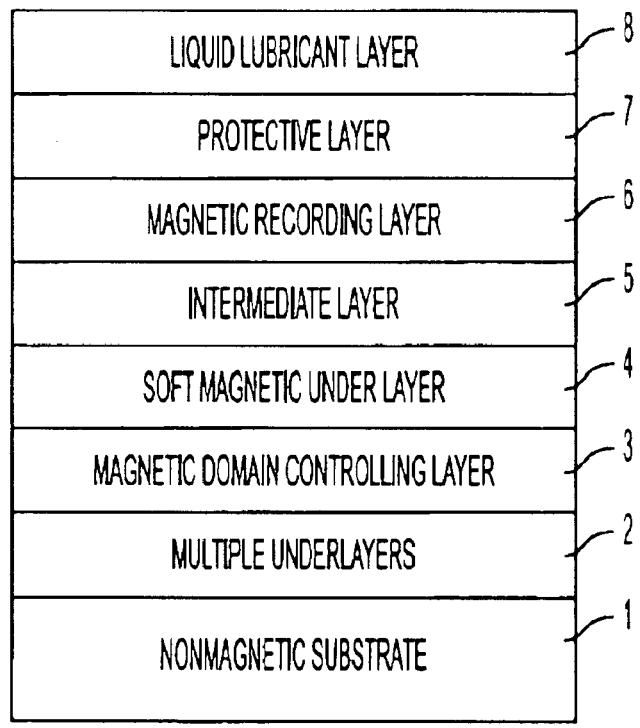
FIG. 2 is a schematic sectional view showing the perpendicular magnetic recording medium in accordance with an alternative embodiment of the present invention.

FIG. 2 is a schematic sectional view showing the perpendicular magnetic recording medium according to an alternative embodiment of the present invention. The perpendicular magnetic recording medium has a structure in which at least one under layer or underlayer 2, a magnetic domain controlling layer 3, the soft magnetic under layer 4, the intermediate layer 5, the magnetic recording layer 6 and the protective layer 7 are formed in a predetermined order on the nonmagnetic substrate 1, and moreover the liquid lubricant layer 8 is formed thereupon.

In an embodiment of the present invention, for example, a crystallized glass, a strengthened glass, or an Al alloy plated with NiP as commonly used for magnetic recording media can be used as the nonmagnetic substrate 1. An antiferromagnetic film including an alloy system containing Mn, or a hard magnetic film in which a magnetization has been oriented in a radial direction of the nonmagnetic substrate 1, can be used as the magnetic domain controlling layer 3. A thickness of the magnetic domain controlling layer 3 may be about 5 to 300 nm.

In a case that an Mn alloy system antiferromagnetic film is used as the magnetic domain controlling layer 3, a nonmagnetic alloy or a nonmagnetic simple metal may be used having a face-centered cubic structure as the underlayer 2. In this case, an underlayer may be further provided between the nonmagnetic substrate 1 and the underlayer 2 to control the fine structure of the underlayer 2.

Moreover, in the case that a hard magnetic film is used as the magnetic domain controlling layer 3, a Cr alloy or the like can be used as the underlayer 2. In this case as well, a plurality of underlayers may be further provided between the nonmagnetic substrate 1 and the underlayer 2 to control the fine structure of the underlayer 2.

An NiFe alloy, a sendust (FeSiAl) alloy or the like can be used as the soft magnetic under layer 4. However, using an amorphous Co alloy as the soft magnetic under layer 4, such as CoNbZr, CoTaZr or the like, good electromagnetic conversion characteristics can be obtained. Regarding a thickness of the soft magnetic under layer 4, an optimum value varies according to a structure and characteristics of the magnetic head used in recording, but the thickness may be at least 10 nm but not more than 300 nm in view of productivity.

The intermediate layer 5 is used to magnetically separate the soft magnetic under layer 4 and the magnetic recording layer 6, and to control characteristics of the magnetic recording layer 6. A nonmagnetic element or a nonmagnetic alloy can be used for the intermediate layer 5 as appropriate and a thickness from 5 to 30 nm may be used.

The magnetic recording layer 6 includes a rare earth-transition metal alloy amorphous film. Examples of materials for the rare earth-transition metal alloy amorphous film include TbCo and TbFeCo, but there is no limitation to these materials. Moreover, at least one element being Ti, Zr, Hf, V, Nb, Ta, Cr, Mo, W, B, Al, C and Si is included in the rare earth-transition metal alloy amorphous film, which are uniformly dispersed through the rare earth-transition metal alloy amorphous film.

Alternatively, at least one boride of Ti, Zr, Hf, V, Nb, Ta, Cr, Mo, W, Al or Si is included in the rare earth-transition metal alloy amorphous film, which is uniformly dispersed on the rare earth-transition metal alloy amorphous film. Alternatively, at least one carbide of Ti, Zr, Hf, V, Nb, Ta, Cr, Mo, W, B, Al or Si is included in the rare earth-transition metal alloy amorphous film, which is uniformly dispersed on the rare earth-transition metal alloy amorphous film. Due to the element(s) or the boride(s) or the carbide(s) being uniformly dispersed on the rare earth-transition metal alloy amorphous film, magnetic domain walls existing between recorded bits are fixed in recorded positions, and hence shifting or loss of recorded signals is suppressed even during recording at a high recording density.

To achieve the high recording density, it is necessary to disperse fine additive(s) uniformly through the film. As a method of adding the additive(s) into the rare earth-transition metal alloy amorphous film, a method may be used in which a target into which the additive(s) has/have been added is produced and the additive(s) is/are deposited together with the rare earth-transition metal alloy, or a method may be used in which chips of the additive(s) are placed on a rare earth-transition metal alloy amorphous target and deposition is carried out.

A concentration of the additive(s) (i.e., the element(s) or the boride(s) or the carbide(s)) in the film may be at least 1 atomic % but not more than 20 atomic %. In the case that the concentration of the additive(s) is less than 1%, because the amount of the additive(s) is too low, it is not possible to sufficiently fix the magnetic domain walls. If the concentration of the additive(s) is greater than 20%, because the amount of the additive(s) is too high, the characteristics of the rare earth-transition metal alloy amorphous film will not be obtained sufficiently, and the medium will no longer function as a perpendicular magnetic recording medium. To obtain sufficient characteristics as the perpendicular magnetic recording medium, the concentration of the additive(s) must be at least 1 atomic % but not more than 20 atomic %.

When depositing the magnetic recording layer 6, the pressure of the gas used during the deposition may be at least 10 mTorr but not more than 200 mTorr. The thickness of the magnetic recording layer 6 is from 5 to 100 nm, for instance, from 10 to 50 nm.

A conventionally used protective film can be used as the protective layer 7. Regarding conditions of the protective layer 7 such as thickness, the conditions may be used as for a normal magnetic recording medium. Moreover, a conventionally used material may also be used for the liquid lubricant layer 8. For example, a perfluoropolyether type lubricant may be used for the liquid lubricant layer 8. Regarding the conditions of the liquid lubricant layer 8 such as the thickness, the conditions used with a normal magnetic recording medium can be used as is.

EXAMPLE 1

Following is a description of examples in accordance with exemplary embodiments of the present invention. The following examples are merely suitable representative examples of the present invention, and do not limit the present invention in any way.

Using a chemically strengthened glass substrate having smooth surfaces (for example, an N-5 glass substrate made by Hoya Corp.) may be used as the nonmagnetic substrate 1. The nonmagnetic substrate 1 washed and then put into the sputtering apparatus, and a CoZrNb amorphous soft magnetic under layer is deposited thereon of 200 nm, and a TiCr intermediate film of 15 nm. Next, using a composite target in which Ti, Zr, Hf, V, Nb, Ta, Cr, Mo, W, B, Al, C or Si chips are placed on a TbCo target, deposition of the magnetic recording layer is carried out at a gas pressure of 20 mTorr.

The proportion of the additive (i.e., the element(s), the boride(s), or the carbide(s)) is adjusted by changing the number of chips placed on the target. The thickness of the magnetic recording layer is made constant at 30 nm. Finally, a 5 nm protective layer including carbon is deposited, and then the medium is removed from the vacuum apparatus. All of the deposition except that of the magnetic recording layer 6 is carried out using a DC magnetron sputtering method under a gas pressure of 5 mTorr. Afterwards, a 2 nm liquid lubricant layer including a perfluoropolyether is formed using a dipping method, thus producing the perpendicular magnetic recording medium.

Using the above-mentioned method, the perpendicular magnetic recording media are produced by changing the type of the additive added to the magnetic recording layer 6. The magnetic characteristics are calculated by measuring the magnetization curve using a vibrating sample magnetometer. Regarding the electromagnetic conversion characteristics of the perpendicular magnetic recording media for which all of the layers are deposited using the method indicated in the above example, a measurement is carried out with an MR head using a spin stand tester.

As coercivity Hc and an SNR value (signal-to-noise ratio, an electromagnetic conversion characteristic) at a linear recording density of 350 kFCI are shown in Table 1 for the perpendicular magnetic recording media that are produced adding about 10 at % of Ti, Zr, Hf, V, Nb, Ta, Cr, Mo, W, B, Al, C or Si to the rare earth-transition metal alloy amorphous film.

TABLE 1

Coercivity and SNR value

| | Hc (Oe) | SNR (at 350 kFCI) (dB) |
|---|---|---|
| TbCo | 4290 | 13.8 |
| TbCo-9 at % Ti | 3880 | 21.7 |
| TbCo-10 at Zr | 3720 | 20.4 |
| TbCo-9 at Hf | 3430 | 20 |
| TbCo-11 at % V | 3680 | 18.9 |
| TbCo-11 at % Nb | 3780 | 20.5 |
| TbCo-10 at % Ta | 3990 | 21.8 |
| TbCo-12 at % Cr | 3390 | 19.2 |
| TbCo-10 at % Mo | 3840 | 20.1 |
| TbCo-10 at % W | 3500 | 19.8 |
| TbCo-10 at % B | 4120 | 22.1 |
| TbCo-9 at % Al | 3420 | 19.5 |
| TbCo-10 at % C | 3960 | 20.7 |
| TbCo-9 at % Si | 3710 | 20.6 |

As a comparative example, the Hc and SNR values are also shown for a perpendicular magnetic recording medium that is produced without carrying out addition of an element. In a case of adding any of the elements, Hc dropped slightly compared with a case were addition of an element is not carried out, but a relatively high value of Hc of above 3000 Oe is obtained.

Moreover, it can be seen that in the case that addition of an element is not carried out, the SNR value at a recording density of 350 kFCI is about 13.8 dB, but by adding Ti, Zr, Hf, V, Nb, Ta, Cr, Mo, W, B, Al, C or Si, the characteristic improved from about 5.1 to 8.3 dB. Moreover, in a case of combining two or more of the above-mentioned additives, good magnetic characteristics and electromagnetic conversion characteristics can be obtained.

EXAMPLE 2

The perpendicular media is produced as in Example 1, except that the type of chips placed on the TbCo target is made to be a boride of Ti, Zr, Hf, V, Nb, Ta, Cr, Mo, W, Al or Si.

The coercivity Hc and the SNR value at a linear recording density of 350 kFCI are shown in Table 2 for the perpendicular magnetic recording media that are produced adding about 10 at % of a boride of Ti, Zr, Hf, V, Nb, Ta, Cr, Mo, W, Al or Si to the rare earth-transition metal alloy amorphous film.

TABLE 2

Coercivity and SNR value

|  | Hc (Oe) | SNR (at 350 kFCI) (dB) |
|---|---|---|
| TbCo | 4290 | 13.8 |
| TbCo-10% TiB2 | 3670 | 24.5 |
| TbCo-10% ZrB2 | 3590 | 23.6 |
| TbCo-11% HfB2 | 3440 | 23.9 |
| TbCo-11% VB2 | 3570 | 22.4 |
| TbCo-10% NbB2 | 3710 | 23.1 |
| TbCo-10% TaB2 | 4020 | 25.5 |
| TbCo-12% CrB2 | 3330 | 24.3 |
| TbCo-9% MoB2 | 3240 | 22.9 |
| TbCo-10% WB | 3560 | 23.7 |
| TbCo-10% AlB2 | 3720 | 22.1 |
| TbCo-9 at % SiB6 | 3660 | 23.4 |

As a comparative example, the Hc and SNR values are also shown for the perpendicular magnetic recording medium that is produced without carrying out addition of an element. As with the results shown in Table 1, in the case of adding any of the borides, Hc dropped slightly compared with the case that addition of an element is not carried out, with the highest coercivity of 4020 Oe being obtained in the case that TbB$_2$ was added. Even in the case of adding MoB$_2$, for which the lowest coercivity is shown, a value of about 3240 Oe is obtained.

Regarding the SNR value, it can be seen that in the cases of all of the additives, the characteristic improved by about 8.3 to 11.7 dB compared with the comparative example in which addition of an element is not carried out. The case where the highest SNR value is obtained is when TaB$_2$ is added, with a good characteristic of 25.5 dB being obtained. Moreover, in the case of combining two or more of the above-mentioned borides, similarly good magnetic characteristics and electromagnetic conversion characteristics can be obtained.

EXAMPLE 3

Perpendicular media is produced as in Example 1, except that the type of chips placed on the TbCo target is a carbide of Ti, Zr, Hf, V, Nb, Ta, Cr, Mo, W, B, Al or Si.

The coercivity Hc and the SNR value at a linear recording density of 350 kFCI are shown in Table 3 for the perpendicular magnetic recording media that are produced adding about 10 at % of a carbide of Ti, Zr, Hf, V, Nb, Ta, Cr, Mo, W, B, Al or Si to the rare earth-transition metal alloy amorphous film.

TABLE 3

Coercivity and SNR value

|  | Hc (Oe) | SNR (at 350 kFCI) (dB) |
|---|---|---|
| TbCo | 4290 | 13.8 |
| TbCo-10% TiC | 3680 | 22.7 |
| TbCo-10% ZrC | 3440 | 23.4 |
| TbCo-8% HfC | 3550 | 24.1 |
| TbCo-11% VC | 3720 | 23.9 |
| TbCo-11% NbC | 3530 | 23.7 |
| TbCo-10% TaC | 3490 | 24.1 |
| TbCo-10% Cr3C2 | 3660 | 22.5 |
| TbCo-11% Mo2C | 3570 | 21.8 |
| TbCo-10% W2C | 3710 | 23.5 |
| TbCo-10% B4C | 3870 | 23.6 |
| TbCo-9% Al4C3 | 3480 | 22.9 |
| TbCo-9% SiC | 3420 | 23.7 |

As a comparative example, the Hc and SNR values are also shown for the perpendicular magnetic recording medium that is produced without adding an element. As with the results shown in Table 1, in the case of adding any of the carbides, Hc dropped slightly compared with the case that addition is not carried out. However, even in the case of SiC, for which the coercivity value is lowest, a value of about 3240 Oe is obtained.

Regarding the SNR value, it can be seen that in all the cases where an element is added, the characteristic improved by about 8 to 10.3 dB compared with the perpendicular magnetic recording medium of the comparative example for which addition of an element is not carried out. The highest SNR value is obtained when HfC or TaC is added, with the SNR at a linear recording density of 350 kFCI being 24.1 dB. Moreover, in a case of combining two or more of the above-mentioned carbides, good magnetic characteristics and electromagnetic conversion characteristics can be obtained.

EXAMPLE 4

As an example of cases in which a pure element is added, using a composite target in which V or B chips are placed on the TbCo target, the perpendicular magnetic recording media are produced, with a proportion of the additive contained in the rare earth-transition metal alloy amorphous film being adjusted by changing the number of chips placed on the target.

The coercivity Hc and the SNR value at a linear recording density of 350 kFCI are shown in Table 4 for the perpendicular magnetic recording media that are produced with a concentration of the additive being changed. B is shown as the additive for which the characteristics are best, and V as the additive for which the characteristics are worst.

TABLE 4

Coercivity and SNR value

|  | Hc (Oe) | SNR (at 350 kFCI) (dB) |
|---|---|---|
| TbCo | 4290 | 13.8 |
| TbCo-1 at % V | 4150 | 15.1 |
| TbCo-11 at % V | 3680 | 18.9 |
| TbCo-18 at % V | 3080 | 15.7 |
| TbCo-25 at % V | 2130 | 8.6 |
| TbCo-1 at % B | 4220 | 16.5 |

TABLE 4-continued

Coercivity and SNR value

|  | Hc (Oe) | SNR (at 350 kFCl) (dB) |
|---|---|---|
| TbCo-10 at % B | 4120 | 22.1 |
| TbCo-20 at % B | 3680 | 16.3 |
| TbCo-26 at % B | 2450 | 10.1 |

As a comparative example, the Hc and SNR values are also shown for the perpendicular magnetic recording medium that is produced without carrying out addition of an element. In the case of either element B or V, Hc decreases monotonically as the concentration of the additive increases, and in the case that more than 20 at % is added, Hc becomes a value less than 3000 Oe. In the case of either element B or V, by adding 1 at % or more, the SNR value at a recording density of 350 kFCl shows a good value of over 15 dB.

However, in the case of adding either element B or V, if the amount added exceeds 20 at % then the SNR value drops abruptly, becoming a value of 8.6 dB in the case of V and 10.1 dB in the case of B. It can thus be seen that in the case of either element B or V, it is necessary to make the amount added at least 1 at % but not more than 20 at %.

EXAMPLE 5

As an example of cases in which a boride is added, using a composite target in which $TaB_2$ or $AlB_2$ chips are placed on the TbCo target, the perpendicular magnetic recording media are produced, with the proportion of the additive contained in the rare earth-transition metal alloy amorphous film being adjusted by changing the number of chips placed on the target.

The coercivity Hc and the SNR value at a linear recording density of 350 kFCl are shown in Table 5 for the perpendicular magnetic recording media that are produced while changing the concentration added of the $TaB_2$ or the $AlB_2$. $TaB_2$ is shown as the additive for which the characteristics are best, and $AlB_2$ as the additive for which the characteristics are lowest, out of the borides that were deposited.

TABLE 5

Coercivity and SNR value

|  | Hc (Oe) | SNR (at 350 kFCl) (dB) |
|---|---|---|
| TbCo | 4290 | 13.8 |
| TbCo-1% TaB2 | 4180 | 16.7 |
| TbCo-10% TaB2 | 4020 | 25.5 |
| TbCo-19% TaB2 | 3770 | 17.1 |
| TbCo-25% TaB2 | 2590 | 12.5 |
| TbCo-1% AlB2 | 4190 | 15.3 |
| TbCo-10% AlB2 | 3720 | 22.1 |
| TbCo-19% AlB2 | 3210 | 16.7 |
| TbCo-23% AlB2 | 2580 | 12.6 |

As a comparative example, the Hc and SNR values are also shown for a perpendicular magnetic recording medium that is produced without carrying out addition of an element. In the case of either boride, Hc decreases monotonically as the amount of $TaB_2$ or the $AlB_2$. $TaB_2$ added increases, and in the case that more than 20 at % is added, Hc becomes a value less than 3000 Oe. In the case of either boride, by adding 1 at % or more, the SNR value at a recording density of 350 kFCl shows a good value of over 15 dB.

However, in the case of adding either boride, if an amount added exceeds 20 at % then the SNR value drops abruptly, becoming a value of 12.5 dB in the case of $TaB_2$ and 12.6 dB in the case of $AlB_2$. It can thus be seen that in the case of either of the borides, it is necessary to make the amount added at least 1 at % but not more than 20 at %.

EXAMPLE 6

As an example of cases in which a carbide is added, using a composite target in which HfC or $Mo_2C$ chips are placed on the TbCo target, the perpendicular magnetic recording media are produced, with a proportion of the additive contained in the rare earth-transition metal alloy amorphous film is adjusted by changing the number of chips placed on the target.

The coercivity Hc and the SNR value at a linear recording density of 350 kFCl are shown in Table 6 for the perpendicular magnetic recording media that are produced while changing the concentration added of the HfC or $Mo_2C$. HfC is shown as the additive for which the characteristics are best, and $Mo_2C$ as the additive for which the characteristics are lowest out of the carbides that were deposited.

TABLE 6

Coercivity and SNR value

|  | Hc (Oe) | SNR (at 350 kFCl) (dB) |
|---|---|---|
| TbCo | 4290 | 13.8 |
| TbCo-1% HfC | 4200 | 16.3 |
| TbCo-8% HfC | 3550 | 24.1 |
| TbCo-20% HfC | 3010 | 15.7 |
| TbCo-22% HfC | 2760 | 13.6 |
| TbCo-1% Mo2C | 4180 | 15.9 |
| TbCo-11% Mo2C | 3570 | 21.8 |
| TbCo-20% Mo2C | 3170 | 15.4 |
| TbCo-24% Mo2C | 2330 | 11.1 |

As a comparative example, the Hc and SNR values are also shown for the perpendicular magnetic recording medium that is produced without carrying out addition of an element. In the case of either carbide, Hc decreases monotonically as a concentration added increases, and in the case that more than 20 at % is added, Hc becomes a value less than 3000 Oe. In the case of either carbide, by adding 1 at % or more, the SNR value at a recording density of 350 kFCl shows a good value of over 15 dB.

However, in the case of adding either carbide, if the amount added exceeds 20 at % then the SNR value drops abruptly, becoming a value of 13.6 dB in the case of HfC and 11.1 dB in the case of $MO_2C$. It can thus be seen that in the case of either of the carbides, it is necessary to make the amount added at least 1 at % but not more than 20 at %.

EXAMPLE 7

As an example of cases in which a pure element and the carbide, or the pure element and the boride, or the carbide and the boride are added at the same time, using a composite target in which Ta and $W_2C$ chips, or Zr and $NbB_2$ chips, or $TiB_2$ and $Cr_3C_2$ chips are placed on the TbCo target, the perpendicular magnetic recording media are produced, with the proportions of the additives contained in the rare earth-transition metal alloy amorphous film being adjusted by changing the number of chips placed on the target.

The coercivity Hc and the SNR value at a linear recording density of 350 kFCl are shown in Table 7 for the perpendicular magnetic recording media produced.

TABLE 7

Coercivity and SNR value

| | Hc (Oe) | SNR (at 350 kFCl) (dB) |
|---|---|---|
| TbCo | 4290 | 13.8 |
| TbCo-1 at % Ta-1% W2C | 4080 | 16.7 |
| TbCo-6 at % Ta-5% W2C | 3490 | 22.4 |
| TbCo-11 at % Ta-9% W2C | 3150 | 15.8 |
| TbCo-13 at % Ta-11% W2C | 2260 | 11.5 |
| TbCo-1 at % Zr-1% NbB2 | 4110 | 15.3 |
| TbCo-5 at % Zr-5% NbB2 | 3580 | 20.7 |
| TbCo-9 at % Zr-9% NbB2 | 3300 | 17.9 |
| TbCo-11 at % Zr-11% NbB2 | 2940 | 13.9 |
| TbCo-1 at % TiB2-1% Cr3C2 | 4200 | 16.2 |
| TbCo-5 at % TiB2-4% Cr3C2 | 3660 | 23.4 |
| TbCo-10 at % TiB2-9% Cr3C2 | 3130 | 16.1 |
| TbCo-11 at % TiB2-10% Cr3C2 | 2470 | 14.5 |

As a comparative example, the Hc and SNR values are also shown for the perpendicular magnetic recording medium that is produced without adding elements. In the cases that a plurality of added elements are combined, as with the cases that addition of a single additive is carried out, by adding 1 at % or more, the SNR value at a recording density of 350 kFCl shows a good value of over 15 dB.

However, if the amount added exceeds 20 at % then the SNR value drops abruptly, becoming a value less than 15 dB. Thus, in the case that addition of a combination of the pure element, a boride, and a carbide, it is necessary to make the combination added at least 1 at % but not more than 20 at %.

EXAMPLE 8

A chemically strengthened glass substrate having smooth surfaces (for example, an N-5 glass substrate made by Hoya Corp.) is used as the nonmagnetic substrate 1. The nonmagnetic substrate 1 is washed and then put into the sputtering apparatus, and a Ta underlayer is deposited to 5 nm, an NiFeCr orientation controlling layer is deposited to 5 nm, an IrMn magnetic domain controlling layer is deposited to 10 nm, a CoZrNb amorphous soft magnetic under layer is deposited to 200 nm, and a TiCr intermediate film to 15 nm. Next, chips of Ti, Zr, Hf, V, Nb, Ta, Cr, Mo, W, B, Al, C or Si or a boride or carbide thereof are placed on the TbCo target, and a deposition is carried out at a gas pressure of 20 mTorr.

The proportion of the additive is adjusted by changing the number of chips placed on the target. The thickness of the magnetic recording layer is made constant at 30 nm. Finally, a 5 nm protective layer including carbon is deposited, and then the medium is removed from the vacuum apparatus. All of the deposition except that of the magnetic recording layer 6 is carried out using a DC magnetron sputtering method under a gas pressure of 5 mTorr. Afterwards, a 2 nm liquid lubricant layer including a perfluoropolyether is formed using a dipping method, thus producing the perpendicular magnetic recording medium.

Using the above-mentioned method, the perpendicular magnetic recording media are produced, variously changing the type and proportion of the additive added to the magnetic recording layer 6. The magnetic characteristics are calculated by measuring the magnetization curve using the vibrating sample magnetometer. Regarding the electromagnetic conversion characteristics of the perpendicular magnetic recording media for which all of the layers are deposited using the method indicated in the above example, measurement is carried out with the MR head using the spin stand tester.

No particular difference is found in the magnetic characteristics or the SNR between the perpendicular magnetic recording media produced using the method of Example 8 and the perpendicular magnetic recording media produced using the method of Example 1.

Figure 3:
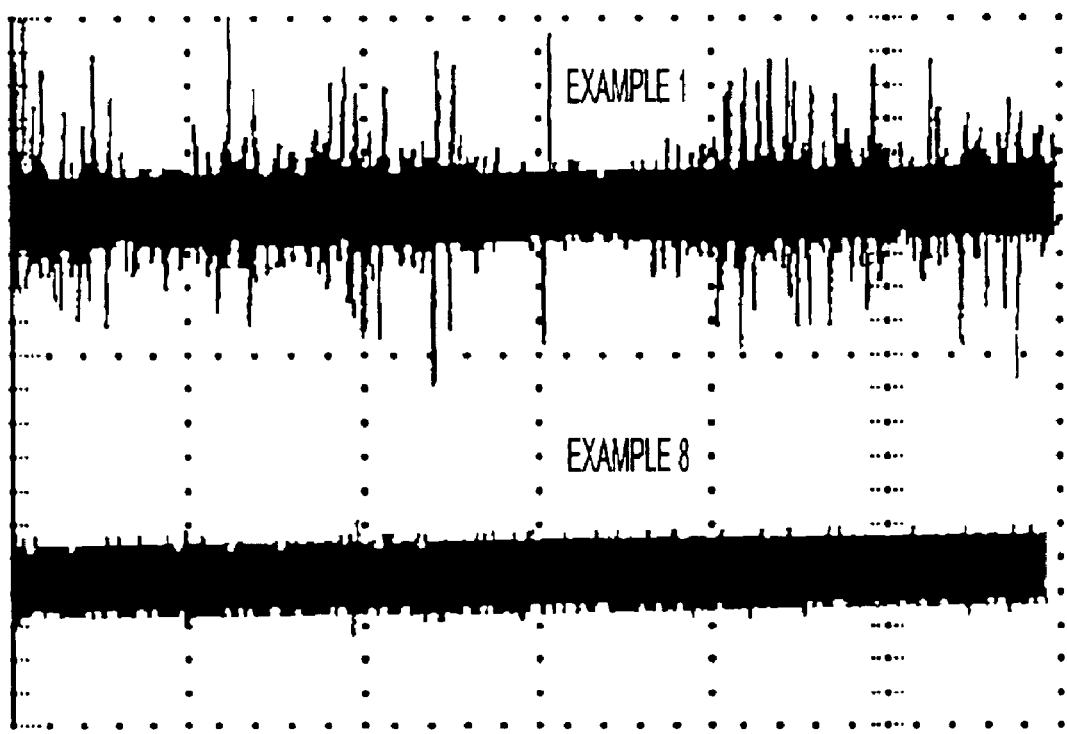
FIG. 3 is a diagram showing one cycle of an output waveform obtained using a spin stand tester for the perpendicular magnetic recording medium in accordance with embodiments of the present invention.

One cycle of the output waveform obtained using the spin stand tester for the perpendicular magnetic recording medium of Example 8 is shown in FIG. 3. As a comparative example, the output waveform for the perpendicular magnetic recording medium of Example 1 in which the underlayer and the magnetic domain controlling layer are not provided is also shown in FIG. 3. In the case that there are no underlayer and no magnetic domain controlling layer, uneven spike noises occur throughout the entire cycle. In contrast, if the underlayer and the magnetic domain controlling layer are provided, then no spike noises occur at all. There are no spike noises because if the underlayer and the magnetic domain controlling layer are provided, then the magnetic domain walls are not formed in the soft magnetic under layer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A perpendicular magnetic recording medium, comprising:
   a soft magnetic under layer;
   an intermediate layer;
   a magnetic recording layer comprising a rare earth-transition metal alloy amorphous film and at least one of Ti, Zr, Hf, V, Nb, Mo, W, B, Al, C and Si uniformly dispersed in the rare earth-transition metal alloy amorphous film;
   a protective layer;
   a liquid lubricant layer; and
   a nonmagnetic substrate, wherein the soft magnetic under layer, the intermediate layer, the magnetic recording layer, and the protective layer are built up in a predetermined order on the nonmagnetic substrate.

2. A perpendicular magnetic recording medium, comprising:
   a soft magnetic under layer;
   an intermediate layer;
   a magnetic recording layer comprising a rare earth-transition metal alloy amorphous film and at least one of Ti, Zr, Hf, V, Nb, Ta, Cr, Mo, W, B, Al, C and Si uniformly dispersed in the rare earth-transition metal alloy amorphous film;
   a protective layer;
   a liquid lubricant layer; and
   a nonmagnetic substrate, wherein the soft magnetic under layer, the intermediate layer, the magnetic recording layer, and the protective layer are built up in a predetermined order on the nonmagnetic substrate, wherein a concentration of the at least one of Ti, Zr, Hf, V, Nb, Ta, Cr, Mo, W, B, Al, C and Si in the rare earth-transition metal alloy amorphous film is at least 1 atomic % but no more than 20 atomic %.

3. The perpendicular magnetic recording medium as claimed in claim 1, further comprising:

an underlayer; and a magnetic domain controlling layer, wherein the underlayer and the magnetic domain controlling layer are between the nonmagnetic substrate and the soft magnetic under layer.

4. A perpendicular magnetic recording medium, comprising:

a soft magnetic under layer;

an intermediate layer;

a magnetic recording layer comprising a rare earth-transition metal alloy amorphous film and at least one boride of Ti, Zr, Hf, V, Nb, Ta, Cr, Mo, W, Al or Si uniformly dispersed in the rare earth-transition metal alloy amorphous film;

a protective layer; and a nonmagnetic substrate, wherein the soft magnetic under layer, the intermediate layer, the magnetic recording layer, and the protective layer are built up in a predetermined order on the nonmagnetic substrate.

5. The perpendicular magnetic recording medium as claimed in claim 4, further comprising:

an underlayer; and a magnetic domain controlling layer, wherein the underlayer and the magnetic domain controlling layer are between the nonmagnetic substrate and the soft magnetic under layer.

6. A perpendicular magnetic recording medium, comprising:

a soft magnetic under layer;

an intermediate layer;

a magnetic recording layer comprising a rare earth-transition metal alloy amorphous film and at least one carbide of Ti, Zr, Hf, V, Nb, Ta, Cr, Mo, W, B, Al or Si uniformly dispersed in the rare earth-transition metal alloy amorphous film;

a protective layer;

a liquid lubricant layer; and a nonmagnetic substrate, wherein the soft magnetic under layer, the intermediate layer, the magnetic recording layer, and the protective layer are built up in a predetermined order on the nonmagnetic substrate.

7. The perpendicular magnetic recording medium as claimed in claim 6, wherein a concentration of the least one carbide of Ti, Zr, Hf, V, Nb, Ta, Cr, Mo, W, B, Al, C and Si in the rare earth-transition metal alloy amorphous film is at least 1 atomic % but no more than 20 atomic %.

8. The perpendicular magnetic recording medium as claimed in claim 6, further comprising:

an underlayer; and a magnetic domain controlling layer, wherein the underlayer and the magnetic domain controlling layer are between the nonmagnetic substrate and the soft magnetic under layer.

9. The perpendicular magnetic recording medium as claimed in claim 7, further comprising:

an underlayer; and a magnetic domain controlling layer, wherein the underlayer and the magnetic domain controlling layer are between the nonmagnetic substrate and the soft magnetic under layer.

\* \* \* \* \*